(12) United States Patent
Zettervall

(10) Patent No.: US 9,502,869 B2
(45) Date of Patent: Nov. 22, 2016

(54) TOOL AND METHOD FOR EXTRACTING WIRES FROM A CABLE

(71) Applicant: ABB TECHNOLOGY LTD, Zürich (CH)

(72) Inventor: Björn Zettervall, Nättraby (SE)

(73) Assignee: ABB Technology Ltd., Zürich (CH)

( * ) Notice: Subject to any disclaimer, the term of this patent is extended or adjusted under 35 U.S.C. 154(b) by 0 days.

(21) Appl. No.: 14/913,526

(22) PCT Filed: Sep. 17, 2013

(86) PCT No.: PCT/EP2013/069253
§ 371 (c)(1),
(2) Date: Feb. 22, 2016

(87) PCT Pub. No.: WO2015/039678
PCT Pub. Date: Mar. 26, 2015

(65) Prior Publication Data
US 2016/0204583 A1    Jul. 14, 2016

(51) Int. Cl.
*B25B 27/067*    (2006.01)
*H02G 1/12*    (2006.01)

(52) U.S. Cl.
CPC .................................. *H02G 1/1297* (2013.01)

(58) Field of Classification Search
CPC ........ B23Q 3/186; B23Q 3/183; B23Q 7/00; B23P 19/10; B23P 19/12
See application file for complete search history.

(56) References Cited

U.S. PATENT DOCUMENTS

| | | |
|---|---|---|
| 3,162,945 A | 12/1964 | Stabs |
| 3,355,803 A | 12/1967 | Hanlon et al. |
| 3,831,274 A | 8/1974 | Horrocks |
| 4,507,867 A | 4/1985 | Haas, Jr. |
| 4,682,413 A | 7/1987 | Keller |
| 5,142,780 A | 9/1992 | Brewer |
| 5,287,716 A | 2/1994 | Szulc |
| D410,178 S * | 5/1999 | Clayson .......................... D8/16 |
| D419,848 S * | 2/2000 | Kirby ............................... D8/89 |
| 6,094,821 A | 8/2000 | College et al. |
| D439,490 S * | 3/2001 | Bagley ............................. D8/89 |
| 6,351,881 B1 * | 3/2002 | Peckich ................... B25B 27/04 254/131 |
| D532,661 S * | 11/2006 | Wood ............................... D8/14 |
| 7,131,636 B1 * | 11/2006 | Gurmu ..................... B25C 11/00 254/28 |
| 7,143,491 B2 * | 12/2006 | Wood ...................... B25B 27/04 29/275 |
| 2012/0174411 A1 | 7/2012 | Ducret |

FOREIGN PATENT DOCUMENTS

| | | |
|---|---|---|
| GB | 1 380 251 | 1/1975 |
| GB | 2 392 318 A | 2/2004 |
| SU | 851586 A1 | 7/1981 |
| WO | WO 2008/073363 A2 | 6/2008 |

OTHER PUBLICATIONS

Machine translation of SU-851586-A1, published Jul. 30, 1981, 1 page.

* cited by examiner

*Primary Examiner* — Lee D Wilson
(74) *Attorney, Agent, or Firm* — Birch, Stewart, Kolasch & Birch, LLP

(57) ABSTRACT

A tool for extracting armour wires from a cable having an armouring layer includes a curved beak for grasping an armour wire, and an elongated body having a bottom surface provided with a protruding tip for separating two neighboring armour wires. The tip is protrudes away from the bottom surface and is elongated in a direction parallel to the bottom surface.

20 Claims, 2 Drawing Sheets

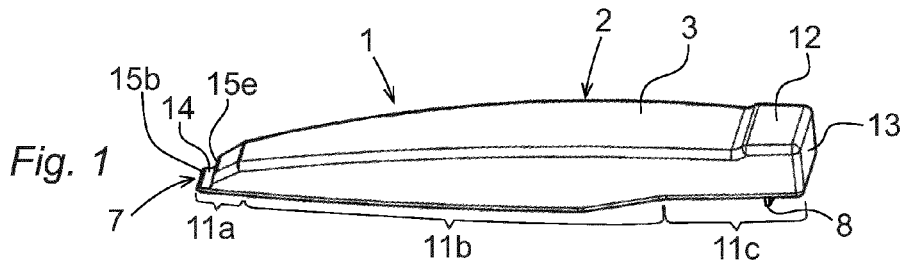
Fig. 1
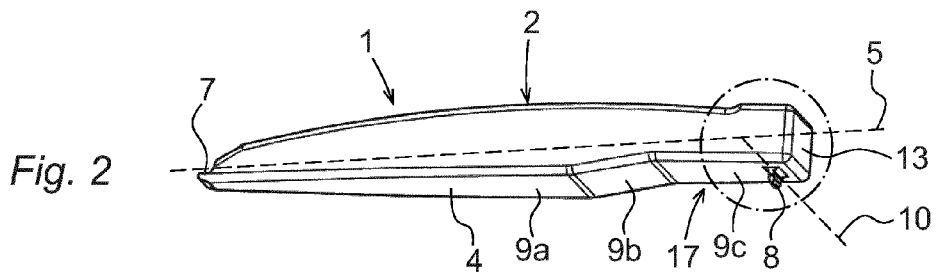
Fig. 2
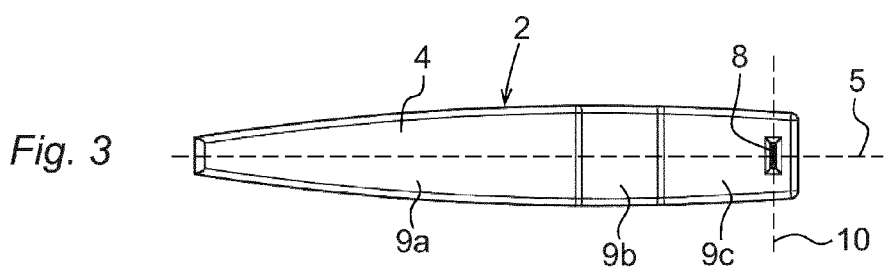
Fig. 3
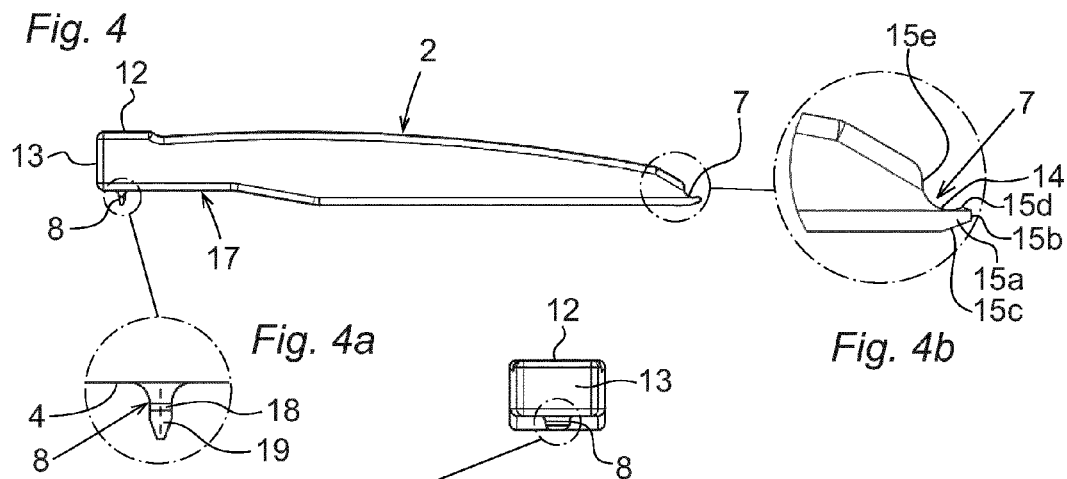
Fig. 4
Fig. 4a
Fig. 4b
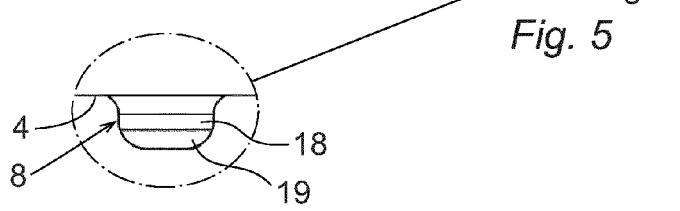
Fig. 5
Fig. 5a

TOOL AND METHOD FOR EXTRACTING WIRES FROM A CABLE

FIELD OF THE INVENTION

The present invention relates to a tool for extracting wires from a cable having an armouring layer, and in particular to a tool for extracting armour wires from a cable. The present invention also relates to a method for extracting armour wires from a cable using such tools.

PRIOR ART

A traditional three phase high voltage sea cable includes three parallel core members, each core member including a conductor surrounded with insulation and an outer protective sheet. The core members are surrounded by at least one armouring layer including armour wires in the form of metal wires tightly wound around the core members, for strengthening the cable against tensile and torsion forces. The armour wires are wound so that the wires are very close to each other. It is known to have single as well as double armouring layer on the cable. The armouring layer is arranged along the entire length of the cable and surrounds the core members.

During maintenance and repair of a cable, it is often necessary to open the armouring layer at a position at a distance from the ends of the cable. This is difficult in particular due to tensile stresses of the armour wires. Today there exist no safe method to open the armoring layer in the middle of a cable without risk of damaging the underlying layers of the cable, and cause personal injury.

U.S. Pat. No. 4,682,413 discloses a method and a tool for extracting insulated wires from a shielded cable with a minimum of damage to the wire insulation. The cable includes a pair of insulated wires enclosed by a braided shield and an outer insulation covering. An aperture is formed in the shield thereby exposing a section of the insulated wires. An elongated tool including a rounded tip is used to separate the wires from the shield. The rounded tip is inserted between the wires and the shield causing the wires to separate from the shield. The rounded tip grips the wire and the wire is pulled out from the shield. This type of cables does not include any armoring layer. The tool disclosed in this document can not be used to separate the tightly wound armour wires of an armouring layer.

GB1380251 discloses a method and an apparatus for removing the sheath from a metal-sheathed electrical main cable including cable cores surrounded by a concentric aluminum sheath. The apparatus includes two levers. One end of each of such lever is shaped and adapted for manipulation of the cores of the cable. This end is bent inwardly to form a hook for enclosing the core. The other end is bent over to form a crook adapted to remove the aluminum sheath. This type of cables does not include any armoring layer. The tool disclosed in this document is not suitable to separate the tightly wound armour wires of an armouring layer.

OBJECT AND SUMMARY OF THE INVENTION

The object of the present invention is to facilitate the opening of an armouring layer of a cable in order to avoid damaging of the underlying layers or causing personal injury.

According to one aspect of the invention, this object is achieved by a tool as defined in claim 1.

The tool comprises a curved beak for grasping an armour wire, and is characterized in that the tool comprises an elongated body having a bottom surface provided with a protruding tip for separating two neighboring armour wires, and the tip is protruding away from the bottom surface and the tip is elongated in a direction parallel to the bottom surface.

The tool comprises a beak for grasping an armour wire as well as a protruding tip to be used for separating the armour wires and provide a space for the beak to grip the armour wire. It is preferable to use two tools together, the first to make a gap between two wires and the second to lift one wire.

In a first step, the tip is positioned between two neighbouring wires with the longitudinal axis of the tip in parallel with the longitudinal axes of the wires. In a next step, the tip is rotated so that the longitudinal axis of the tip is angular to the longitudinal axes of the wires, by that providing a space between the wires for receiving the beak. In a third step, the beak is entered into the space to grasp the wire. The height of the tip should be adapted to the diameter of the armour wires. Due to the fact that the tip is protruding away from the bottom surface, it is possible to limit the distance between the outer end of the tip and the bottom surface and accordingly to limit the distance the tip is penetrated between the armour wires and by that avoid damage of the underlying layers. Further, due to the fact that the tip is elongated in a direction parallel to the bottom surface, it is possible to use the tip as a lever and bend apart the armour wires to form a space between them for receiving the beak. The tool according to the invention is simple and easy to use.

To make it easy to apply the tip between the armour wires, the tip is preferably protruding from the bottom surface in a direction perpendicular to the bottom surface.

According to an embodiment of the invention, at least a part of the tip has parallel opposing surfaces. Preferably, a part of the tip has parallel opposing surfaces to enable the tip to stay in place after it has been penetrated between the armour wires.

According to an embodiment of the invention, an outer part of the tip is wedge shaped. The wedge shape facilitates for the tip to initiate the penetration between the armour wires.

According to an embodiment of the invention, the tip is arranged with its longitudinal axis perpendicular to the longitudinal axis of the body. One function of the body is to be a handle. This embodiment facilitates the use of the tool since the handle becomes perpendicular to the cable during the penetration between the wires.

According to an embodiment of the invention, the body comprises an upper surface including a flat part arranged opposite the tip. In order to force the tip to penetrate between the wires, a hammer can be used to beat on the body. The flat part is used to receive hammer strokes. Thus, this embodiment facilitates the use of a hammer to force the tip to penetrate between the wires.

According to an embodiment of the invention, the bottom surface is provided with a recess and the protruding tip is arranged in the recess. The recess protects the tip from being damaged when the tool is not in use. Accordingly, this embodiment reduces the risk for damage of the tip when it is not used. A further advantage achieved with the recess is that the amount of material needed to produce the body is reduced, and accordingly costs are reduced.

According to an embodiment of the invention, the beak is a part of the body. Although two tools are needed, it is advantageous to incorporate both the tip and the beak in the same body since then only one type of tool has to be manufactured and sold. This reduces the costs for manufacturing and distribution of the tool. Further, this embodiment facilitates the use of the tool. Another advantage achieved is that, after the wires have been separated by the tip of a first tool and the beak of a second tool has grasped the wire, the beak of the first tool can be used to grip the wire and the first and second tool can be used in cooperation for lifting of the wire. Thus, only two tools are needed instead of three tools for lifting difficult wires.

According to an embodiment of the invention, the body comprises a first end part including the beak, an intermediate part forming a handle, and a second end part including the tip. The beak is provided at a first end part of the body and the protruding tip is provided at a second end part of the body. An intermediate part of the tool can be used as a handle for both the beak and the tip.

According to an embodiment of the invention, the beak has an elongated concave surface extending in a direction transvers the longitudinal axis of the body. The concave surface is used to grasp the armour wire. The fact that the concave surface extends in a direction transvers the longitudinal axis of the body provides an increased contact area between the beak and the armour wire and makes it easier to lift up the wire upon applying a force to the body in a direction towards the cable.

According to an embodiment of the invention, the beak is elongated in a direction transverse the longitudinal axis of the body, and a front part of the beak forms an elongated edge extending in the longitudinal direction of the beak. The elongated edge makes it possible for the beak to penetrate a gap formed between two wires.

According to an embodiment of the invention, the beak comprises a protruding shoulder extending along a rear part of the beak to prevent the beak from penetrating too deep into the cable, and a concave surface extending in the longitudinal direction of the beak and arranged between said shoulder and said edge. The protruding shoulder prevents the beak from being penetrated too deep into the cable, and accordingly prevents the beak from damaging the underlying layers of the cable.

According to an embodiment of the invention, the second end part of the body is provided with a flat end surface arranged opposite the beak. To provide a flat end surface opposite the beak, i.e. in an end surface opposite to the end including the beak, makes it possible to force the beak to grasp the wire using a hammer. The flat end surface is used to receive hammer strokes.

According to another aspect of the invention, this object is achieved by a method for extracting an armour wire from a cable using a tool according to the invention.

The method uses two tools according to the invention. The method comprises the following steps:

a) forcing the tip of a first tool to penetrate between two armour wires of the cable, b) turning the first tool so that the tip creates a gap between the two armour wires, c) placing the beak of the second tool in the gap between the two armour wires so that the beak grasps one of the armour wires, and d) bending down the end of the second tool against the cable so that the armour wire is moved away from the cable.

By using the tip to separate two neighbouring armour wires to form a space between them, it becomes easy to position the beak in the space between the armour and to grasp one of the armour wires and lift the armour wire by bending down the second tool against the cable.

The method according to the invention makes it possible to open the armouring layer in an intermediate part of the cable in a safe way, without causing any damage to underlaying layers of the cable and without risk for personal damages, although the armour wires are exposed to a tensile stress.

According to an embodiment of the invention, the step a further comprises: positioning the tip of the first tool so that the longitudinal axis of the tip is in parallel with the armour wires, and step b further comprises: turning the first tool about a rotational axis perpendicular to the bottom surface of the body. Due to the fact that the tip is elongated, it is possible to use the tip to bend apart the armour wires upon rotating the tip about a rotational axis perpendicular to the bottom surface of the body, from a position with the longitudinal axis of the tip in parallel with the wires to a position with the longitudinal axis of the tip angled with respect to the wires.

According to an embodiment of the invention, the step c further comprises: placing the second tool so that the longitudinal axis of the body is perpendicular to the armour wires and forcing the tool to penetrate the gap until the shoulder is in contact with the wire and the beak partly encloses the armour wire. The body is used as a lever for lifting the armour wire. The penetrating movement of the beak is stopped when the shoulder comes into contact with an upper part of the wire, and thereby the beak is prevented from penetrating too deep into the cable.

BRIEF DESCRIPTION OF THE DRAWINGS

The invention will now be explained more closely by the description of different embodiments of the invention and with reference to the appended figures.

FIG. 1 shows a perspective view seen from above of a tool according to an embodiment of the invention.

FIG. 2 shows a perspective view seen from below of the tool shown in FIG. 1.

FIG. 3 shows a view from below of the tool shown in FIG. 1.

FIG. 4 shows a side view of the tool shown in FIG. 1.

FIG. 4a shows an enlarged side view of a protruding tip for separating two neighboring armour wires.

FIG. 4b shows an enlarged side view of an end part of the tool including a beak FIG. 5 shows a rear view of the tool shown in FIG. 1.

FIG. 5a shows an enlarged rear view of the protruding tip.

DETAILED DESCRIPTION OF PREFERRED EMBODIMENTS OF THE INVENTION

Figure 6:
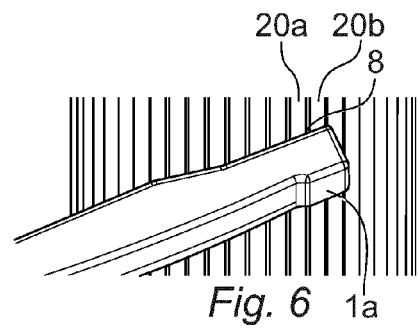
FIGS. 6-10 illustrate a method for extracting an armour wire from a cable using the tool according to the invention.

FIGS. 1-5 show an example of a tool 1 for extracting armour wires from a cable according to an embodiment of the invention. The tool is intended to be used to open a cable tensile armouring layer without damaging the underlying layers. FIG. 1 shows a perspective view seen from above of the tool 1 and FIG. 2 shows a perspective view seen from below of the tool 1. FIG. 3 shows a view from below of the tool, FIG. 4 shows a side view of the tool, and FIG. 5 shows a rear view of the tool. The tool includes an elongated body 2 having an elongated top surface 3 and an elongated bottom surface 4 facing away from each other. The elongated body 2 has a longitudinal axis 5 extending through the center of the body. In this embodiment, the main part of the body has a generally rectangular cross-section area. The body is, for example, made of metal such as annealed steel. The body can be provided with holes to be connected to a security line.

The tool 1 comprises a curved beak 7 for capturing and holding an armour wire and a tip 8 protruding away from the bottom surface 4. Preferably, the body, the tip, and the beak are made in one piece to increase the strength of the tool. The tip is adapted to be used for separating two neighboring armour wires of a cable to provide a space for the beak to grasp the armour wire. Preferably, the tip and the beak are an integral part of the body. In this embodiment, the beak 7 is provided at a first end part of the body 2 and the protruding tip 8 is provided at an opposite end part of the body. It is preferable to use two tools together, a first tool to make a gap between two armour wires and a second tool to lift one of the armour wires. The body comprises a first end part 11a including the beak 7, an intermediate part 11b forming a handle, and a second end part 11c including the tip 8.

The upper surface 3 of the body includes a flat surface part 12 arranged opposite the tip 8. The flat surface part 12 provides a beat surface for a hammer. In order to force the tip to penetrate between the armouring wires, a hammer can be used to beat on the body. The flat part is used to receive hammer strokes. The second end part 11c of the body is provided with a flat end surface 13 to make it possible to use a hammer to force the beak to grasp the armour wire. The flat end surface 13 also provides a beat surface for a hammer.

The bottom surface 4 is bent inwards to form a recess 17 in the second end part, and the protruding tip 8 is arranged in the recess. The fact that the tip 8 is arranged in the recess reduces the risk for damage of the tip when it is not used. As seen from the figure, the recess does not need to have walls surrounding the recess. The bottom surface 4 includes three surface parts 9a-c. The first surface part 9a is flat and extends from the end of the body including the beak towards the center of the body. The second surface part 9b is extending inwards in a direction towards the longitudinal axis 5 of the body. The third surface part 9c is flat and extends along the second end part 9c to the other end of the body. The tip 8 is protruding from the third surface part 9c. The first and third surfaces are in parallel. The first and third surfaces are arranged at a distance from each other in an orthogonal direction, and accordingly are not coplanar. The second and third surface parts 9b-c defines the recess 17.

FIG. 4a shows an enlarged side view of the protruding tip, and FIG. 5a shows an enlarged rear view of the protruding tip. The tip is straight, and accordingly not bent as in the prior art. The tip 8 is protruding from the bottom surface 4 in a direction perpendicular to the bottom surface. An outer part 19 of the tip is wedge shaped in order to facilitate for the tip to penetrate between the armour wires. The outer part 19 of the tip is wedge shaped in a cross-section perpendicular to the longitudinal axis 10 of the tip. The tip includes a part 18 which has parallel opposing surfaces adapted to be in contact with the wires to enable the tip to stay in place after it has been penetrated between the armour wires. Preferably, the height of the part 18 is more than half of the entire height of the tip. The elongated sides of the tip are in contact with a respective one of the armouring wires when the tip penetrates between the wires. Due to the fact that a part of the tip has parallel opposing surfaces, the tip stays in place between the armouring wires after penetration.

FIG. 4a shows a side view of the tip 8, and accordingly discloses the width of the tip. FIG. 5a show a rear view of the tip, and accordingly discloses the length of the tip 8. As shown from the figures, the length of the tip is longer than the width of the tip. The length of the tip is also longer than the height of the tip, as shown in FIG. 5a. The tip 8 is elongated in a direction parallel to the bottom surface 8. This means that the longitudinal axis 10 of the tip is in parallel with the bottom surface 8. In this embodiment, the tip is arranged with its longitudinal axis 10 perpendicular to the longitudinal axis 5 of the body. In order to prevent the tip from protruding too far into the cable and cause damage of the underlying layers of the cable, the height of the tip should be adapted to the diameter of the armour wires. Preferably, the height of the tip is about the same as the diameter of the armour wires, or slightly higher. For example, a tip having a height of 5 mm can be used for separating wires having a diameter between 4 and 6 mm. However, it is also possible to arrange the tip with its longitudinal 10 axis parallel to the longitudinal axis 5 of the body, or with its longitudinal axis 10 in any other angle with respect to the longitudinal axis 5 of the body. Further, the longitudinal axis 5 of the body and the longitudinal axis 10 of the tip are not coplanar. The tip is preferably made of the same material as the body. The tip is, for example, made of a metal such as annealed steel.

FIG. 4b shows an enlarged side view of the beak 7. The beak is elongated in a direction transverse the longitudinal axis 5 of the body. The beak 7 includes an inwardly bent portion having a concave surface 14 extending in a direction transverse the longitudinal axis 5 of the body. In this embodiment, the concave surface 14 is extending in parallel to the longitudinal axis 10 of the tip. The concave surface 14 is designed to grasp one of the armouring wires. In this embodiment, the concave surface 14 is arranged as a part of the top surface 3 of the body. The concave surface 14 of the beak is arranged in a first end of the body and the flat end surface 13 of the body is arranged in the second end of the body. The concave surface 14 is extending in a direction parallel to the flat end surface 13.

A front part 15a of the beak 7 is protruding from the body and has an elongated edge 15b. The edge 15b is extending in a direction transverse the longitudinal direction of the body. The end part 15a has a top surface neighboring the concave surface 14 and a bottom surface facing away from the concave surface 14. The bottom surface of the end part is provided with a bevel 15c arranged so that that the end part is tapering towards the edge 15b. The top surface of the end part is provided with a ridge 15d extending along a front part of the concave surface 14 in the longitudinal direction of the curved surface. The ridge 15d extends in parallel to the edge 15b. The front part 15a is used to penetrate the gap formed between the armouring wires in order to grasp a wire. The beveled bottom surface facilitates for the beak to penetrate between the wires. The ridge 15d prevents the wire from sliding off the beak when the wire is lifted by the tool.

The body comprises a protruding shoulder 15e extending along a rear part of the beak 7 and designed to prevent the beak from penetrating too deep into the cable. The shoulder 15e is protruding from the concave surface 14. The shoulder 15e is extending along a rear part of the concave surface 14 in the longitudinal direction of the curved surface. The concave surface 14 is arranged between the shoulder 15e and the ridge 15d. The shoulder functions as a stop element. When the beak is penetrated between two wires of the cable in order to grasp a wire, the penetrating movement of the beak is stopped when the shoulder comes into contact with an upper part of the wire, and thereby the beak is prevented from penetrating too deep into the cable.

The corners of the tool are rounded to prevent a user from being hurt by the tool.

An example of a method for extracting an armour wire from a cable including a layer of armouring wires using a first and a second tool according to the invention will be described in the following with reference to the FIGS. 4-8. A typical three phase high voltage sea cable includes three parallel core members, each core member including a conductor surrounded with insulation and an outer protective sheet. The three core members are surrounded by at least one armouring layer including a plurality of armour wires 16 for strengthening the cable against tensile and torsion forces. The armour wires are positioned close to each other with a thin slot between each other. An outer protective sheet is surrounding the armour layer. In a first step, the outer protective sheet is removed from a part of the cable so that the armour wires are exposed.

In a second step, a first tool 1a is positioned with its tip 8 above and aligned with the slot between two armouring wires 16a-b, i.e. so that the longitudinal axis of the tip is in parallel with the armour wire, as shown in FIG. 5. The tip 8 of the first tool 1a is forced to penetrate between the two armour wires 16a-b of the cable. For example, a hammer can be used to hammer on the flat surface 12 to force the tip to penetrate between the armor wires. The tip is forced to penetrate between the armour wires until the third surface part 9c of the bottom surface is in contact with the upper parts of the wires. Thereby, the tip is prevented from penetrating too deep into the cable and damage of underlying layers is avoided. The body of the tool is now arranged with its longitudinal axis perpendicular to the armour wires.

In a third step, the first tool 1a is turned so that the tip 8 creates a gap between the two armour wires 16a-b. The first tool 1a is turned about a rotational axis perpendicular to the bottom surface 4 of the body, as seen in FIG. 6.

In a fourth step, the beak 7 of the second tool 1b is placed in the gap between the two armour wires 16a-b so that the beak grasps one of the armour wires 16b, as seen in FIG. 6.

The second tool is placed so that the longitudinal axis of the body is perpendicular to the armour wire and the beak partly encloses the armour wire. The tool is forced to penetrate the gap until the shoulder of the second tool comes into contact with one of the wires, thereby preventing the tool from penetrating too deep into the cable and damage of underlying layers is avoided. For example, a hammer can be used to hammer on the flat end surface 13 to force the beak to penetrate between the armor wires.

Figure 7:
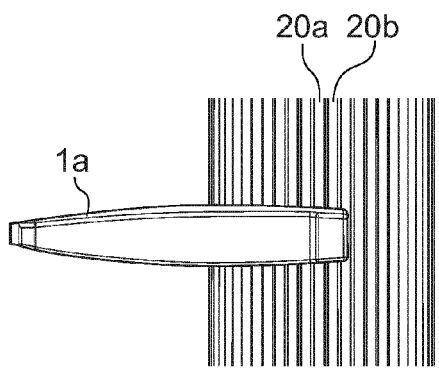
Figure 8:
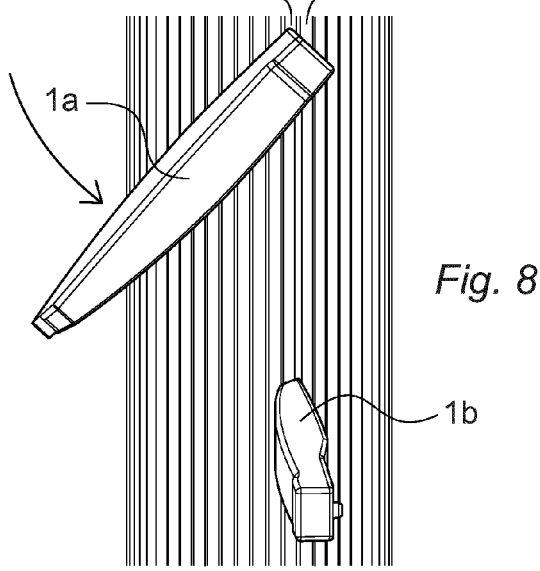
Figure 10:
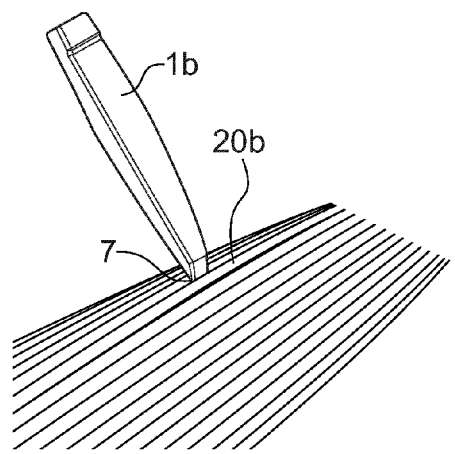
Figure 9:
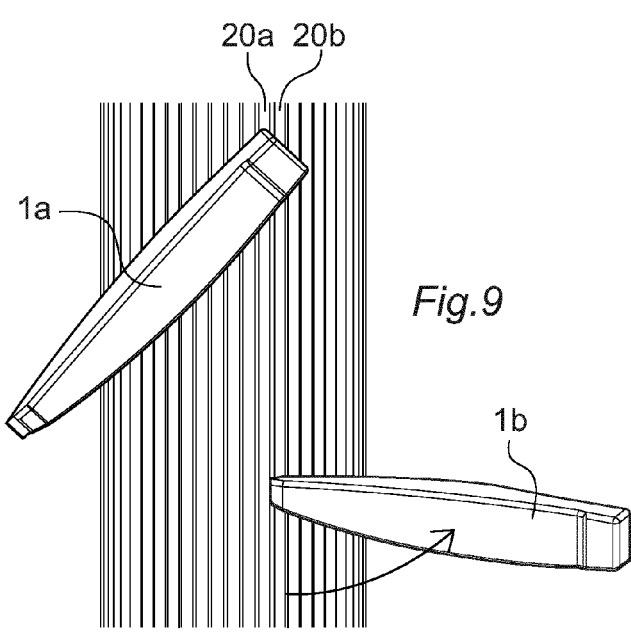

In a fifth step, the armour wire 16b is lifted by bending down the second tool 1b against the cable so that the armour wire is moved away from the cable, as shown in FIG. 7. A force is applied to the body of the second tool to bend down the second tool against the cable, and by that lifting the armour wire. In a next step it is possible to cut the lifted wire, for example with a bolt cutter.

The present invention is not limited to the embodiments disclosed but may be varied and modified within the scope of the following claims. For example, the tip can be elongated in parallel with the longitudinal axis of the body, or with any angle relative the longitudinal axis of the body. The tip can be slightly bent or slightly inclined relative the bottom surface. The tip and the beak can be positioned relative the body in other ways. For example, the beak can be positioned on the bottom surface as well as on the upper surface of the body. Further, the tool may include two separate bodies, one provided with the beak and the other provided with the tip. The tool can be used for AC as well as DC cables.

The invention claimed is:

1. A tool for extracting armour wires from a cable having an armouring layer, the tool comprising:
   a curved beak for grasping an armour wire; and
   an elongated body having a bottom surface provided with a protruding tip for separating two neighboring armour wires,
   wherein said protruding tip protrudes away from the bottom surface and a longitudinal axis of the protruding tip is parallel to the bottom surface, and
   wherein the curved beak is elongated in a direction transverse to a longitudinal axis of the elongated body and a front part of the curved beak forms an elongated edge extending in the longitudinal direction of the curved beak.

2. The tool according to claim 1, wherein said protruding tip protrudes from the bottom surface in a direction perpendicular to the bottom surface.

3. The tool according to claim 1, wherein at least a part of the protruding tip has parallel opposing longitudinal surfaces.

4. A tool for extracting armour wires from a cable having an armouring layer, the tool comprising:
   a curved beak for grasping an armour wire; and
   an elongated body having a bottom surface provided with a protruding tip for separating two neighboring armour wires,
   wherein said protruding tip protrudes away from the bottom surface and is elongated in a direction parallel to the bottom surface,
   wherein the curved beak is elongated in a direction transverse to a longitudinal axis of the elongated body and a front part of the curved beak forms an elongated edge extending in the longitudinal direction of the curved beak, and
   wherein an outer part of the protruding tip is wedge shaped.

5. The tool according to claim 1, wherein said protruding tip is arranged with a longitudinal axis thereof perpendicular to the longitudinal axis of the elongated body.

6. The tool according to claim 1, wherein the elongated body comprises an upper surface including a flat part arranged opposite the protruding tip.

7. The tool according to claim 1, wherein the bottom surface is provided with a recess and the protruding tip is arranged in the recess.

8. The tool according to claim 1, wherein the curved beak is provided at a first end part of the elongated body and the protruding tip is provided at a second end part of the elongated body.

9. The tool according to claim 8, wherein said second end part of the elongated body is provided with a flat end surface arranged opposite the curved beak.

10. The tool according to claim 1, wherein the curved beak comprises:
    a protruding shoulder extending along a rear part of the curved beak to prevent the curved beak from penetrating too deep into the cable; and
    a concave surface extending in the longitudinal direction of the curved beak and arranged between said protruding shoulder and said elongated edge.

11. A tool for extracting armour wires from a cable having an armouring layer, the tool comprising:
    a curved beak for grasping an armour wire; and
    an elongated body having a bottom surface provided with a protruding tip for separating two neighboring armour wires,
    wherein said protruding tip protrudes away from the bottom surface and is elongated in a direction parallel to the bottom surface, and
    wherein the curved beak is elongated in a direction transverse to a longitudinal axis of the elongated body and a front part of the curved beak forms an elongated edge extending in the longitudinal direction of the curved beak, and wherein the elongated body comprises:
> a first end part including the curved beak; an intermediate part forming a handle; and
> a second end part including said protruding tip.

12. A method for extracting an armour wire from a cable using a first and a second tool according to claim 1, wherein the method comprises the following steps:
> forcing the elongated tip of the first tool to penetrate between two armour wires of the cable;
> turning the first tool so that the elongated tip creates a gap between the two armour wires;
> placing the curved beak of a second tool in said gap between the two armour wires so that the curved beak grasps one of the armour wires; and
> bending down the end of the second tool so that the grasped al lour wire is moved away from the cable.

13. The method according to claim 12, wherein the step of forcing further comprises positioning the protruding tip of the first tool so that the longitudinal axis of the protruding tip is in parallel with the armour wires, and the step of turning further comprises turning the first tool about a rotational axis perpendicular to the bottom surface of the elongated body.

14. The method according to claim 12, wherein the curved beak comprises a protruding shoulder extending along a rear part of the curved beak to prevent the curved beak from penetrating too deep into the cable; and a concave surface extending in the longitudinal direction of the curved beak and arranged between said protruding shoulder and said elongated edge, the method further comprising the step of using the second tool, and
> wherein the step of placing further comprises placing the second tool so that the longitudinal axis of the elongated body is perpendicular to the armour wires, forcing the tool to penetrate the gap until the protruding shoulder is in contact with the wire and the curved beak partly encloses one of the armour wires.

15. The tool according to claim 2, wherein at least a part of the protruding tip has parallel opposing longitudinal surfaces.

16. The tool according to claim 2, wherein an outer part of the protruding tip is wedge shaped.

17. The tool according to claim 3, wherein an outer part of the protruding tip is wedge shaped.

18. The tool according to claim 2, wherein said protruding tip is arranged with a longitudinal axis thereof perpendicular to the longitudinal axis of the elongated body.

19. The tool according to claim 3, wherein said protruding tip is arranged with a longitudinal axis thereof perpendicular to the longitudinal axis of the elongated body.

20. The tool according to claim 4, wherein said protruding tip is arranged with a longitudinal axis thereof perpendicular to the longitudinal axis of the elongated body.

* * * * *